United States Patent
Liljeberg

(10) Patent No.: US 8,661,181 B2
(45) Date of Patent: Feb. 25, 2014

(54) MEMORY PROTECTION UNIT IN A VIRTUAL PROCESSING ENVIRONMENT

(75) Inventor: Mika Pekka Liljeberg, Helsinki (FI)

(73) Assignee: Memory Technologies LLC, Las Vegas, NV (US)

( * ) Notice: Subject to any disclaimer, the term of this patent is extended or adjusted under 35 U.S.C. 154(b) by 300 days.

(21) Appl. No.: 12/665,561

(22) PCT Filed: Jun. 28, 2007

(86) PCT No.: PCT/IB2007/001772
§ 371 (c)(1),
(2), (4) Date: Jul. 16, 2010

(87) PCT Pub. No.: WO2009/001153
PCT Pub. Date: Dec. 31, 2008

(65) Prior Publication Data
US 2011/0010483 A1    Jan. 13, 2011

(51) Int. Cl.
*G06F 12/00* (2006.01)
(52) U.S. Cl.
USPC .................................. 711/6; 711/163; 718/1
(58) Field of Classification Search
USPC .......................................... 711/6, 163; 718/1
See application file for complete search history.

(56) References Cited

U.S. PATENT DOCUMENTS

| | | | |
|---|---|---|---|
| 6,606,697 B1 | 8/2003 | Kawahara et al. | |
| 7,275,136 B1 * | 9/2007 | Chen | 711/147 |
| 2003/0093258 A1 | 5/2003 | Fishstein et al. | |
| 2005/0188176 A1 | 8/2005 | Chiang et al. | |
| 2005/0216696 A1 * | 9/2005 | Kawaguchi | 711/206 |
| 2006/0026383 A1 * | 2/2006 | Dinechin et al. | 711/207 |
| 2006/0143595 A1 | 6/2006 | Dostert et al. | |
| 2006/0174053 A1 | 8/2006 | Anderson et al. | |
| 2006/0184713 A1 | 8/2006 | Hildner | |
| 2006/0206687 A1 * | 9/2006 | Vega | 711/206 |
| 2007/0043928 A1 * | 2/2007 | Panesar et al. | 711/206 |
| 2007/0101044 A1 * | 5/2007 | Sudheer | 711/3 |
| 2007/0101099 A1 | 5/2007 | Shinohara et al. | |
| 2009/0112972 A1 * | 4/2009 | Liu | 709/203 |

FOREIGN PATENT DOCUMENTS

EP    0484008 A2    5/1992

OTHER PUBLICATIONS

PCT Published Application and International Search Report mailed on Dec. 31, 2008, for corresponding PCT Application No. PCT/IB2007/001772, 39 pages.

* cited by examiner

*Primary Examiner* — Hashem Farrokh
(74) *Attorney, Agent, or Firm* — Lee & Hayes, PLLC

(57) ABSTRACT

The present invention relates to a memory management system in a virtualized environment. The system comprises a virtual address, a buffer storage such as a translation lookaside buffer provided to store virtual address to physical address translations, a buffer storage such as a page table provided to store virtual address to real address translations and memory protection unit provided to verify whether a physical address obtained from the virtual address is within boundaries of one or more physical system memory regions assigned to a virtual machine.

22 Claims, 7 Drawing Sheets

Permission Table Embodiment

| Row | VM ID | Real (Virtual Physical) Base Address | Physical Base Address | Size |
|---|---|---|---|---|
| 0 | 1 | 0x00000000 | 0x00000000 | 0x01000000 |
| 1 | | 0x10000000 | 0x07000000 | 0x00100000 |
| 2 | | 0xf0000000 | 0xf0000000 | 0x01000000 |
| 3 | | | - | - |
| 4 | 2 | 0x00000000 | 0x10000000 | 0x01000000 |
| 5 | | 0x10000000 | 0x07000000 | 0x00100000 |
| 6 | | | - | - |
| 7 | | | - | - |
| 8 | 3 | 0x00000000 | 0x20000000 | 0x01000000 |
| 9 | | | - | - |
| 10 | | | - | - |
| 11 | | | - | - |
| 12 | | | | |
| 13 | | | | |

Fig. 6

MEMORY PROTECTION UNIT IN A VIRTUAL PROCESSING ENVIRONMENT

RELATED APPLICATION

This application was originally filed as PCT Application No. PCT/IB2007/001772 filed Jun. 28, 2007.

The present invention relates to optimizing memory management and more specifically to optimizing such memory management in a virtual environment.

BACKGROUND

A virtual machine monitor (VMM) provides a virtual processing environment, in which multiple operating systems can be carried out simultaneously on the same computer hardware platform. A virtual machine monitor (VMM) carried out on a computer system presents to other software making use of the virtual processing environment an hardware abstraction in the form of one or more virtual machines (VMs). That is, a virtual machine monitor (VMM) is software that is aware of virtualization processor/platform architecture and implements policies to virtualize and manage access to hardware resources shared among the other software. Virtualization refers to technology to share or replicate hardware resources among multiple instances of virtual machines (VMs) or any other guest software. Sharing or replication of the hardware resources must be transparent to the guest software. Hence, virtualization creates the illusion to the guest software to be carried out on a dedicate computer hardware platform such that guest software expects to own hardware resources.

A virtual machine (VM) or guest is a processing environment that makes use of the virtualized resources created by the virtual machine monitor (VMM). The guest may function as a self-contained platform, running its own operating system (i.e., a guest operating system (OS)) and other software. Software making use of the virtual processing environment created by the virtual machine monitor (VMM) will be referred to as guest or guest software. The guest software is said to be hosted by the virtual machine monitor (VMM) and to be running on virtualized resources. The guest software expects to operate as if it were running on a dedicated computer rather than a virtual machine. The virtual machine monitor (VMM) is transparent to the guest software. Hence, the guest software cannot determine whether a virtual machine monitor (VMM) provides a hardware abstraction layer or whether the hardware resources are provided by a dedicated computer hardware platform. Accordingly, the guest software expects to control various events and to have access to hardware resources, such as processor-resident resources (e.g., control registers), resources that reside in memory (e.g., various tables) and resources that reside on the underlying hardware platform (e.g., input/output (I/O) devices).

Virtual machine technology has been developed to allow multiple instances of operating systems (guest OS's) to be carried out on a single computer system by virtualizing the hardware resources including processors, memory and I/O devices. One of the key virtualization issues for a virtual machine monitor (VMM) is how to virtualize the memory and the processor's memory management unit (MMU) resources, including a translation lookaside buffer (TLB) and hardware walker resources for each guest software execution environment.

This is especially so, as the virtual machine monitor (VMM) may need to create and carry out multiple guest OS execution environments simultaneously and may need to create a similar platform memory address layout for each guest software execution environment. In another example, the virtual machine monitor (VMM) may create the illusion of a larger amount of physical memory space to a guest OS execution environment than the actual amount of main memory available on the hardware platform. The virtual machine monitor (VMM) also needs to prevent direct guest access to physical memory for security reasons and should also prevent one guest from accessing physical memory belonging to a different guest.

To meet the above requirements of creating virtualized physical memory mappings for a guest OS execution environment, the virtual machine monitor (VMM) needs to implement an extra layer of address conversion logic that translates from a guest physical address to a physical address when a virtual address is translated to a guest physical address through a translation lookaside buffer (TLB). This is called "MMU (TLB) virtualization". However, the conversion logic requires complex software, is cumbersome and is incompatible with off-the-shelf software, such as shrink-wrap operating systems.

A need thus exists to improve execution of guest software in a virtual machine environment.

SUMMARY

According to an exemplary aspect of the present invention, a memory management system in a virtualized environment is provided. The system comprises a virtual address, a virtual machine exposed by a virtual machine monitor; a first buffer (e.g. a translation lookaside buffer) which is provided to store virtual address to physical address translations, and a memory protection unit, which is provided to verify whether a physical address obtained from the virtual address is within boundaries of one or more physical system memory regions assigned to a virtual machine.

According to an exemplary embodiment of the present invention, a second buffer (e.g. a page table) is provided to store virtual address to real address (or virtual physical address) translations. The second buffer comprises at least one guest page table. The protection unit is further provided to translate a real address (or virtual physical address) into the physical address.

According to an exemplary embodiment of the present invention, a processor includes the first buffer; and a virtual machine monitor, which maintains the memory protection unit. The second buffer is stored in a physical host system memory assigned to the virtual machine.

According to an exemplary embodiment of the present invention, a memory management unit comprises the first buffer and the second buffer.

According to an exemplary embodiment of the present invention, the virtual machine is provided to maintain the translations of the second buffer.

According to an exemplary embodiment of the present invention, a permission table is provided to store one or more physical host memory regions assigned to one or more virtual machines. The permission table is comprised by the memory protection unit.

According to an exemplary embodiment of the present invention, The addresses comprise a virtual machine identifier.

According to an exemplary embodiment of the present invention, virtual machine identifiers are assigned by the virtual machine monitor to each virtual machine.

According to another exemplary aspect of the present invention, a method of operating a memory management system in a virtualized environment is provided. A virtual address and a virtual machine exposed by a virtual machine monitor are provided. It is checked whether a virtual address to physical address translations is available at a first buffer store (e.g. the translation lookaside buffer). In case of a miss (i.e. a translation is unavailable), it is verified at a memory protection unit whether a physical address obtained from the virtual address is within boundaries of one or more physical system memory regions assigned to a virtual machine.

According to an exemplary embodiment of the present invention, the virtual address is translated into a real address at a second buffer (i.e. a page table) comprising at least one guest page table. The real address is translated into the physical address at the memory protection unit.

According to an exemplary embodiment of the present invention, the memory protection unit is maintained by a virtual machine monitor and the second buffer is stored in a physical host system memory assigned to the virtual machine.

According to an exemplary embodiment of the present invention, the translations of the second buffer are maintained by the virtual machine.

According to an exemplary embodiment of the present invention, one or more physical host memory regions are assigned to one or more virtual machines in a permission table, which is comprised by the memory protection unit.

According to an exemplary embodiment of the present invention, The addresses comprise a virtual machine identifier. The addresses include at least one out of a group comprising the virtual machine identifier, a virtual page number, a real page number, a physical page number, and an offset.

According to an exemplary embodiment of the present invention, the virtual machine identifiers are assigned to each virtual machine by a virtual machine monitor.

According to an exemplary embodiment of the present invention, a computer-readable medium having code sections thereat is provided, which code sections when executed cause a virtualized system to provide a virtual address and to check whether a virtual address to physical address translations is available at a first buffer store. In case of a miss (i.e. a translation is not available), the system is further caused to verify whether a physical address obtained from the virtual address is within boundaries of one or more physical system memory regions assigned to a virtual machine.

According to another exemplary aspect of the present invention, a processor is provided, which comprises a first buffer configured for storing virtual address to physical address translations and a protection unit configured for verifying whether a physical address obtained from a virtual address is within boundaries of one or more physical system memory regions assigned to a virtual machine. The virtual machine is exposed by a virtual machine monitor carried out at the processor.

According to an exemplary embodiment of the present invention, the processor further comprises a second buffer, which is configured for storing virtual address to real address translations. The second buffer comprises at least one guest page table. The protection unit is adapted for translating a real address into said physical address.

According to an exemplary embodiment of the present invention, the processor is configured for carrying out the virtual machine monitor adapted for maintaining the protection unit. The second buffer is stored in a physical host system memory assigned to the virtual machine. The physical host system memory is accessible by the processor.

According to an exemplary embodiment of the present invention, the processor further comprises a management unit, which includes the first buffer and the second buffer.

According to an exemplary embodiment of the present invention, the virtual machine is configured for maintaining the translations buffered in the second buffer According to an exemplary embodiment of the present invention, the processor further comprises a permission table configured for storing one or more physical host memory regions assigned to one or more virtual machines. The permission table is comprised by the protection unit.

According to an exemplary embodiment of the present invention, the addresses comprise a virtual machine identifier.

According to an exemplary embodiment of the present invention, the virtual machine identifiers are assigned by said virtual machine monitor to each virtual machine.

According to another exemplary aspect of the present invention, a processing device is provided, which comprises a virtual address, a virtual machine exposed by a virtual machine monitor, and a processor. The processor comprises a first buffer configured for storing virtual address to physical address translations and a protection unit configured for verifying whether a physical address obtained from a virtual address is within boundaries of one or more physical system memory regions assigned to a virtual machine. The virtual machine is exposed by the virtual machine monitor carried out at the processor.

According to an exemplary embodiment of the present invention, the processing device is one out of a group comprising a desktop processing device, a server processing device, a portable processing device, and a portable processing device capable for wireless communication.

BRIEF DESCRIPTION OF THE DRAWINGS

These and other additional objects and features of the present invention will become readily apparent when the same are set forth in greater detail in the accompanying detailed description of the embodiments with reference being made to the drawings in which like reference numerals represent like or similar parts throughout and in which:

FIG. 6 depicts schematically a permission table maintained in the memory protection unit (MPU) of FIG. 4 according to an exemplary embodiment of the present invention.

DETAILED DESCRIPTION

Figure 1A:
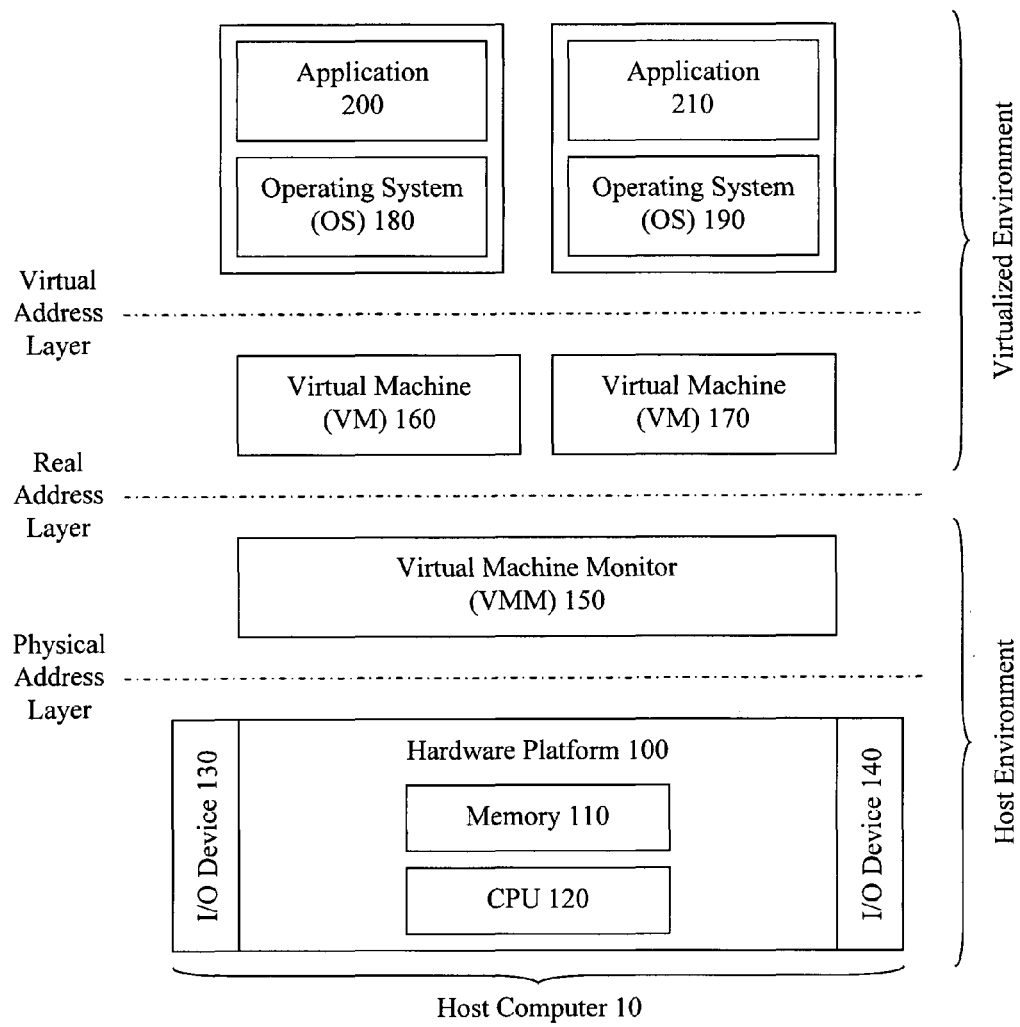
FIGS. 1a and 1b depict schematically block diagrams showing functional components of virtualized processing environments set up by virtual machine monitors (VMM) on general processing host computers according to exemplary embodiments of the present invention.

The following embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. It should be noted that references to "an", "one", or "various" embodiments in this document are not necessarily to the same embodiment, and such references contemplate more than one embodiment.

This document discusses, among other things, intra-body communication technologies and data communication protocol framework thereof. The data communication protocol framework in particular relates to scheduling of data communication within an intra-body communication network to prevent interference between data communications originating from different network devices at the same time.

As shown in the drawings for purposes of illustration, the present invention is embodied in a computer at which a virtual machine monitor (VMM) is carried out. The computer is not limited to any particular type. Examples of computers include file servers, web servers, workstations, mainframes, personal computers, personal digital assistants (PDAs), print servers, network appliances, and in general processing enabled devices. The computer can be contained in a single box, or distributed among several boxes.

FIG. 1a shows different layers of an exemplary computer 10 carrying out the virtual machine monitor (VMM) 150 according to an exemplary embodiment of the present invention. The computer 10 has a hardware layer 100. The hardware layer 100 typically includes one or more processing units (CPU) 120, memory storage 110 and one or more input/output (I/O) devices 130, 140. Exemplary I/O devices include, without without the present invention being limited thereto, network interfaces, hard disk controllers, video interface cards, host bus adapters, and serial port adapters. The memory storage 110 refers to the any memory storage that is internal to the computer 10 (e.g., internal memory cache, main system memory) as opposed to external mass storage devices such as disk drives coupled via any I/O interfaces.

A virtual machine monitor (VMM) 150 is structurally interposed between the hardware layer 100 and an operating system layer 180, 190. The virtual machine monitor (VMM) 150, which may be loaded during boot-up of the computer, obtains control of the computer hardware at boot time, and maintains hardware control until the computer is shut down. The virtual machine monitor (VMM) 150 enables one or more guest software instances (which may also be designated guest operation instances, herein) to be carried out simultaneously in the operating system layer. The virtual machine monitor (VMM) 150 provides one or more virtual machines (VMs) 160, 170. The virtual machines (VMs) 160, 170 represent a virtualized hardware layer 100 of the computer 10. This means, the virtual machine monitor (VMM) 150 is used to expose one or more virtualizations of the computer 10, which virtualizations exposed by the virtual machine monitor (VMM) 150 are schematically illustrated as one or more separate virtual machines (VMs) 160, 170. A virtual machine (VM) represents a virtualized environment in which at least one operating system instance may be carried out. In other words, the virtual machine monitor (VMM) 150 exports features of the virtualized computer hardware platform to create the virtual machine (VM) that is functionally equivalent to an actual hardware platform. The virtual machine monitor (VMM) 150 may generally perform all of the functions that would be performed by a physical implementation of the virtualized hardware platform to achieve the same results. According to the exemplary embodiment shown in FIG. 1a an operating system (OS) instance 180 is carried out within the virtual machine (VM) 160 and an operating system (OS) instance 190 is carried out within the virtual machine (VM) 170. Each operation system (OS) may allow for running one or more applications 200 and 210, respectively.

For operating system point of view, a virtual machine (VM) 160, 170 exposed by the virtual machine monitor (VMM) 150 may not be distinguished from a real physical processing machine such as the computer 10. Hence, the operating system instance 180, 190 may not have to be adapted to be carried out within the virtual machines (VMs) 160, 170. The virtualizations of the computer 10 exposed by the virtual machine monitor (VMM) as virtual machines (VMs) 160, 170 may differ. This means, the virtual machine monitor (VMM) 150 may expose different virtualizations including virtualized hardware components having physical hardware analogues at the hardware layer 100 and/or virtual hardware components, which do not have such physical hardware analogues. For instance, a virtual machine (VM) may provide one or more virtual network interfaces for being accessed by an operating system carried out in its virtualized environment. Such a virtual network interface may be a virtualization of a network interface of the hardware layer 100 or may be a virtual network interface allowing for connecting to another virtual machine (VM) exposed by the virtual machine monitor (VMM).

Applications 200 and 210 are carried out in the environment created by the operating system instances 180 and 190, respectively. It should be understood that application 200 or application 210 represent one or more applications carried out in the environment created by the respective operating system instances 180 and 190, During execution, guest software 180 to 210 can be stored on computer readable media such as memory; and during distribution, the software can be provided on computer readable media such as external devices, removable storage media (e.g., optical discs), etc.

The virtual machine monitor (VMM) is transparent to the guest software and provides a hardware abstraction including virtualized resources to the guest software. Hence, guest software such as an operating system provided the operating system can be run on the underlying hardware platform does not need any modifications or adaptations to run in the virtual processing environment created by the virtual machine monitor (VMM) 150 or designed for that purpose. Thus, the virtual machine monitor (VMM) 150 is transparent to the operating system instances. Similarly, the hardware layer 100 need not provide special support for the virtual machine monitor (VMM) 150.

Applications and operating systems typically access virtual memory, which is an abstraction of the physical memory. In this view, the virtualization on the basis of the virtual machine monitor (VMM) 150 represents a generalization of a virtual memory management, which is also known in the field of operating systems. One aspect of the virtual memory management is to simulate a larger physical memory than is actually available. Virtual memory is an addressing methodology which is used in multitasking operation systems. In multitasking operation systems applications taking advantage of virtual memory addressing methodology experience unitary system memory resources, although the physical memory allocated to the application may be non-continuous. Hence, fragmentation and compaction of the physical memory is avoided.

Typically, virtual memory management is combined with segmentation. Virtual and physical memory are divided up into small chunks of memory called pages. Each virtual memory access is translated into a "physical" access in order to reach the actual memory in the hardware layer. The mapping of virtual pages to physical pages is typically defined by the operating system and usually represented by "page tables".

Figure 1B:
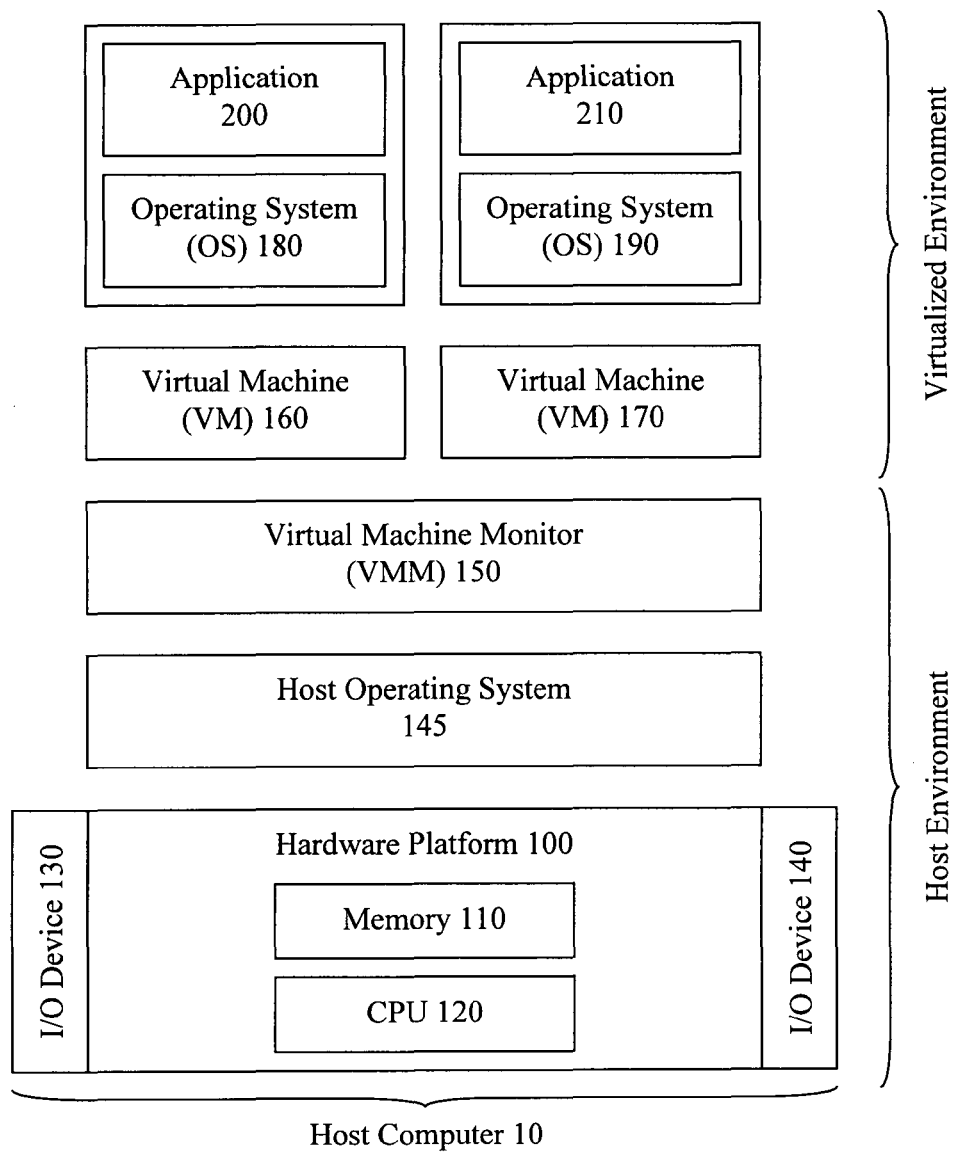

FIG. 1b shows different layers of an exemplary computer 10 carrying out the virtual machine monitor (VMM) 150 according to another exemplary embodiment of the present invention. With reference to FIG. 1a, a category of a virtualization implementation according to an exemplary embodiment of the present invention has been illustrated. According to the exemplary embodiment schematically depicted in FIG. 1a, this implementation category may be designated as native system implementation, in which the virtual machine monitor (VMM) 150 is set up directly on the top of the hardware layer 100 of the host computer 10 and hence, the virtual machine monitor (VMM) 150 is carried out in the system mode of the host computer 10.

With reference to FIG. 1b, another category of a virtualization implementation according to an exemplary embodiment of the present invention is schematically depicted. This implementation category may be designated as moderated system implementation, in which the virtual machine monitor (VMM) 150 is set up directly on the top of a host operating system 145. This means, in moderated system implementation the host operating system 145 is interposed between the hardware layer 100 of the host computer 10 and the virtual machine monitor (VMM) 150. Hence, the virtual machine monitor (VMM) 150 may be operated in user mode of the host operating system 145 or the virtual machine monitor (VMM) 150 may be system mode of the host computer 10. The different modes, i.e. user mode and system mode, may be subjected to different access restrictions.

It should be noted that a further implementation category, which may be designated as dual mode system implementation, may be realized. In dual mode system implementation a host operating system 145 is interposed between the hardware layer 100 of the host computer 10 and the virtual machine monitor (VMM) 150 and the virtual machine monitor (VMM) 150 is set up directly on the top of the hardware layer 100 of the host computer 10. The latter direct set up on the hardware layer 100 of the host computer 10 may be obtained in dual mode system implementation by the means of extensions of the host operating system allowing the virtual management monitor (VMM) 150 for direct access to the hardware layer 100.

Figure 2:
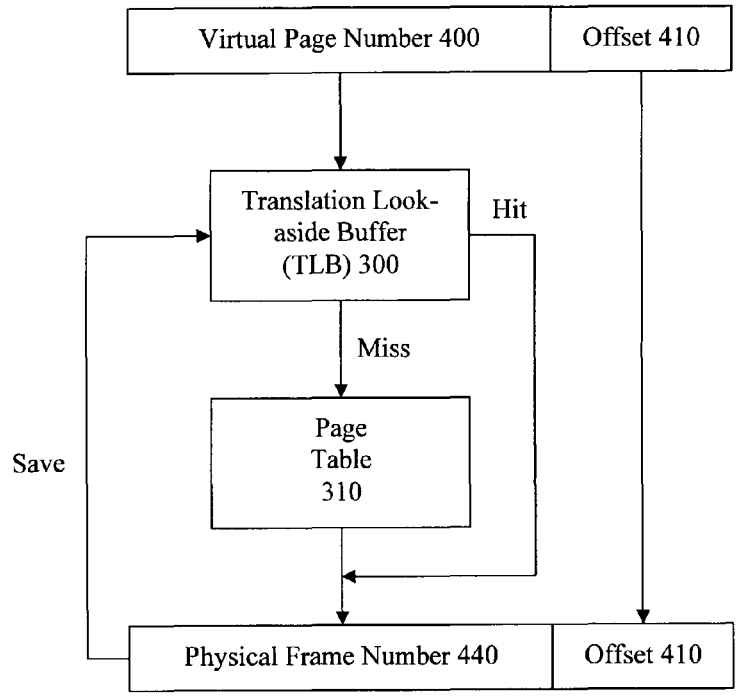
FIG. 2 depicts schematically a block diagram showing functional components of a memory management unit (MMU) enabling virtual-to-physical address translation according to an exemplary embodiment of the present invention.

FIG. 2 schematically illustrates a conventional hardware based implementation of the virtual memory translation stage. A memory management unit (MMU) provides the hardware based implementation of virtual memory management, i.e. the memory management unit (MMU) is responsible for translating virtual addresses used by applications into physical addresses of the physical system memory. The page tables 310 are set up by an operating system for each process. Each page table contains a list of page table entries (PTEs), and each page table entry (PTE) typically maps one virtual page number 400 to one physical page number 440 and defines its permissions (read, write, execute, etc.) for that page (it should be mentioned that on some architectures one page table entry (PTE) can map more than one page).

The virtual address space of a computer program or a process is divided into a number of pages. As used herein, a process is generally an instance of a computer program. Each of these pages can be numbered consecutively, resulting in virtual page numbers. In the same way, the physical address space of the RAM can be divided into pages as well. These pages can also be numbered consecutively, resulting in physical page numbers. A virtual address can be viewed as specifying a virtual page number in the upper bits and an offset within that page in the lower bits. In the same way, a physical address can be viewed as a physical page number combined with an offset into that physical page. For example, in a system having 32-bit addresses and a 4 Kbyte page size the upper 20 bits of an address can be viewed as a page number and the lower 12 bits can be viewed as an offset within a given page. Then, so long as both virtual pages and physical pages begin at an address that is a multiple of the 4 Kbyte page size, the address translation process can be viewed as converting the upper address bits from a virtual page number to a physical page number, with the lower address bits remaining unchanged as the offset into the respective pages.

As the operating system instance and application access virtual addresses, those accesses are typically translated into physical accesses by a translation lookaside buffer (TLB) 300 which is typically arranged within the CPU of the computer system. When a virtual address is accessed for which there is not a valid translation in the translation lookaside buffer (TLB) 300, the appropriate page table entry (PTE) is read from the current page table, and then loaded into the translation lookaside buffer (TLB) 300. The translation lookaside buffer (TLB) 300 is typically an associative buffer memory and is used to accelerate physical accesses. The translation lookaside buffer (TLB) 300 is implemented on hardware basis in some systems (i.e. so-called architectured TLB) and managed internally of the hardware. The operation of the architectured translation lookaside buffer (TLB) cannot be modified by the user. In other systems, the translation lookaside buffer (TLB) 300 may be controlled via the Instruction Set Architecture (ISA) interface.

A physical storage cell is addressed on the basis of a virtual page number 400 and an offset 410. The virtual page number 400 is an index into a page table 310, which comprises at the indexed page table element the physical base address 440 corresponding to the page number. The page table associated virtual page numbers with physical base addresses and physical page number, respectively. The physical address is finally obtained by combining the physical base address retrieved from the table and the offset. The offset 410 is simply handed through without being subjected to any processing.

The translation lookaside buffer (TLB) 300 is schematically connected upstream in the operation flow of the memory management unit (MMU). Hence, before retrieving the physical base address from the page table 310, it is check whether the translation lookaside buffer (TLB) 300 caches the physical base address 440 corresponding to the supplied virtual page number 400. A hash number of the virtual page number 400 may be calculated which is compared with hash numbers of stored translation of virtual page numbers to physical base addresses. In case of a match and hit, respectively, the physical base address is immediately available and the time-consuming access to the page table 310 can be omitted. As aforementioned, in case there is not a match translation in the translation lookaside buffer (TLB) 300, the appropriate page table entry (PTE) is read from the current page table, and then loaded into the translation lookaside buffer (TLB) 300. The lookaside buffer (TLB) 300 comprises typically from 64 to 256 entries.

Figures 3A, 3B:
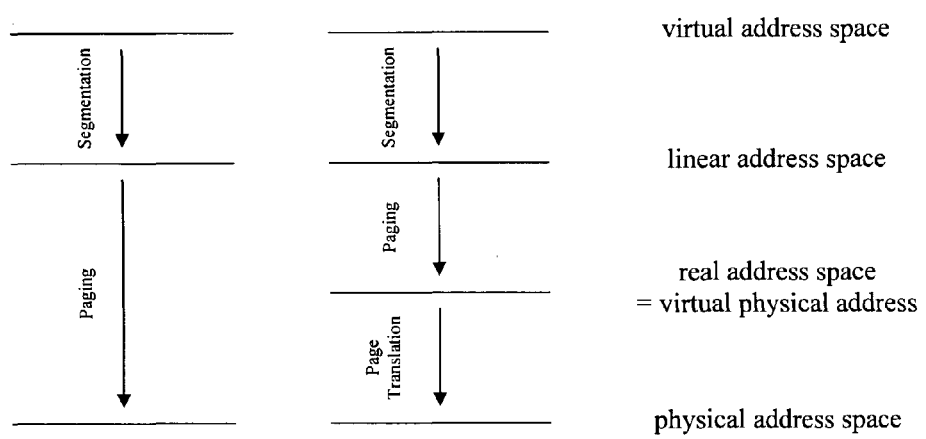
FIGS. 3a to 3b depict schematically memory management hierarchy layers of a processing system supporting virtual addressing and a virtualized system supporting virtual addressing according to exemplary embodiments of the present invention.

FIG. 3*a* schematically illustrates the processing stages of the virtual-to-physical address translation detailed described above with reference to FIG. 2. The memory management unit (MMU) converts the virtual address space into a linear address space on the basis of segments. The paging stage translates the linear address space into the physical address space.

In a virtual processing environment, the memory provided to guest software is an illusion, which is maintained by the virtual machine monitor (VMM) 150. A further logical storage hierarchy layer has to be included in the aforementioned processing stages of the virtual-to-physical address translation. The following hierarchy memory layers can be distinguished:

virtual address space of the guest software;
real address space (or virtual (machine) physical address space exposed by the virtual machine monitor (VMM) or virtual address space of the host); and
physical address space of the hardware layer of the host computer.

As those skilled in the art will appreciate, the terms "real" and "physical" are not equivalent terms. From guest software point of view, the virtual machine monitor (VMM) is transparent. Hence, the guest software expects that the real address space is a physical address space. For hardware layer point of view, the address space set up by the virtual machine monitor (VMM) is a virtual address space. Each virtual machine (VM) maintains its virtual page tables. The memory management of the guest software translates the virtual addresses into real addresses, which are in turn virtual addresses of the hardware layer of host system. These latter virtual addresses are mapped to physical addresses of the hardware layer by the means of the virtual machine monitor (VMM).

In principle, a two-staged translation is required for translating a virtual address of the virtual address space of the guest software into a physical address of the physical address space of the hardware layer of the host system. Due to performance consideration, the two-staged translation should be avoided. Shadow page table may implement the virtual memory management of a virtual machine monitor (VMM). The shadow page-table caches the two staged translation (from guest virtual to guest real/virtual physical and from guest real/virtual physical to physical) in a single translation (virtual to physical) for direct use by the processor.

The shadow page table can be seen as an additional, virtual translation lookaside buffer (TLB) in the memory hierarchy located between the page tables of the guest and the translation lookaside buffer (TLB) of the physical processor. The shadow page table handler behaves similar to a processor translation lookaside buffer (TLB). The shadow page table caches address translations. This cache can become inconsistent to the description required by the guest.

Shadow page table inconsistencies: In these cases the shadow page table is inconsistent with the guest software which corresponds to an update of a hardware translation lookaside buffer (TLB) miss/fault. The most frequent update is triggered by a page-fault in the virtual machine. The shadow page table handler examines the guest's page-table and synthesizes an entry in the shadow page table. If the guest's page-table itself does not contain a valid entry the fault is a true page-fault and injected into the virtual machine. Another cause for synchronization is an address space switch. It requires a flush of the shadow page table which corresponds to the flush of the hardware translation lookaside buffer (TLB).

Changes on the handling of virtual memory of the virtual CPU (VCPU), for instance, enabling and disabling paging cause a flush, too. The shadow page table manager adapts its behavior.

Guest page table inconsistencies: These inconsistencies are caused by the updates of accessed and dirty bits of the processor on the page table. The shadow page table mechanism needs to emulate that behavior as the processor only updates the shadow page table. The access bit is emulated by marking non accessed pages in the guest page table non present in the shadow page table. The resulting 'virtual' page fault is used to propagate the accessed bit update into the guest. The dirty bit is propagated in a similar way by marking non dirty pages in the guest read only in the shadow page table.

This means that the virtual machine monitor (VMM) exercise control over the memory management unit (MMU) and uses memory management unit (MMU) to provide an abstraction of system memory to the guest software hosted by the virtual machine monitor (VMM). As aforementioned, guest software normally expects to have direct access to the memory management unit (MMU). As a result, the virtual machine monitor (VMM) will also have to emulate the memory management unit (MMU) for the guest software in order to ensure transparency of the virtual environment set up by the virtual machine monitor (VMM). The virtual machine monitor (VMM) has to supervise any modifications on translation lookaside buffer (TLB) and page table made by the guest software and the virtual machine monitor (VMM) has to emulate those modifications as necessary. This is quite complex to implement and the emulation of the memory management unit (MMU), due to the very high complexity and execution costs of exceptions in current CPU architectures, which also induces a significant performance overhead.

According to an exemplary embodiment of the present invention, a full system virtualization on the basis of a hardware implementation is presented. In particular, the embodiment of the invention provides efficient share of a memory management unit (MMU) between guest software products running inside different virtual machines (VMs).

According to an exemplary embodiment of the present invention, a separate memory protection unit (MPU) is additionally provided, which is under the control of the virtual machine monitor (VMM). The memory protection unit (MPU) is configured to handle memory protection and memory sharing between different virtual machines (VMs).

According to an exemplary embodiment to the present invention, the memory protection unit (MPU) also translates real addresses of the real address space (in other words, virtual (machine) physical addresses of the virtual (machine) physical address space) set up by the virtual machine monitor (VMM) (also designated "pseudo physical addresses") to physical addresses of the physical address space of the hardware layer of the host. This translation functionality can be used to physical address system memory by the guest software.

The memory protection unit (MPU) according to an exemplary embodiment of the present invention may relieve the virtual machine monitor (VMM) from the aforementioned complex and expensive task of emulating the memory management unit (MMU) towards each virtual machine (VM). Instead, each virtual machine (VM) may have native access to the page table base registers of the memory management unit (MMU) and may be enabled to maintain its own page tables in virtual machine (VM) memory without requiring any intervention of the virtual machine monitor (VMM).

On the other hand, the virtual machine monitor (VMM) may only need to control a permission table maintained by the memory protection unit (MPU) and to control memory sharing between different virtual machines (VMs).

The clear differentiations of policies may reduce the implementation complexity and improves the execution performance of virtualization system in total.

Figure 4:
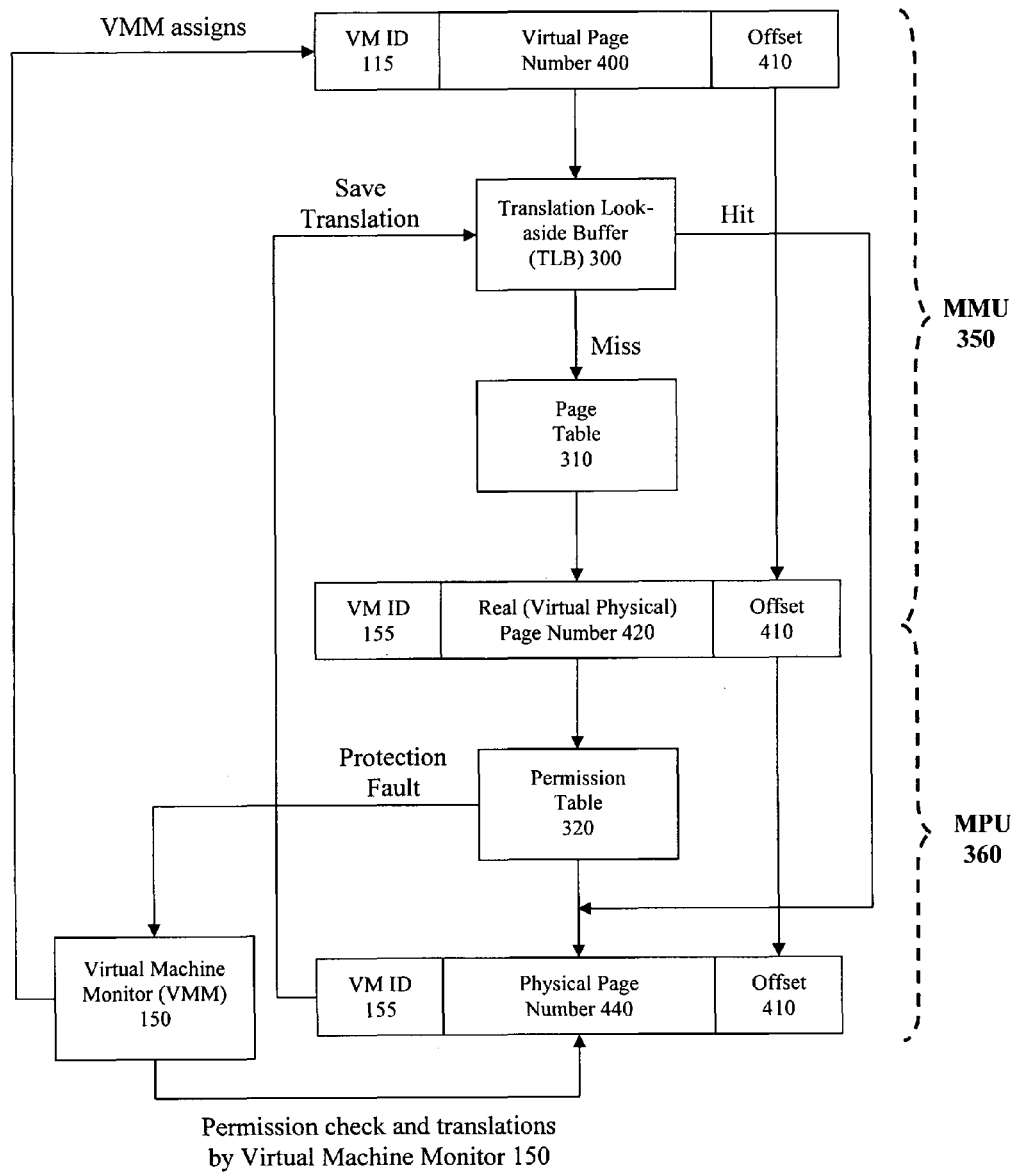
FIG. 4 depicts schematically a block diagram showing functional components of a memory management unit (MMU) and a memory protection unit (MPU) according to an exemplary embodiment of the present invention.
Figure 5:
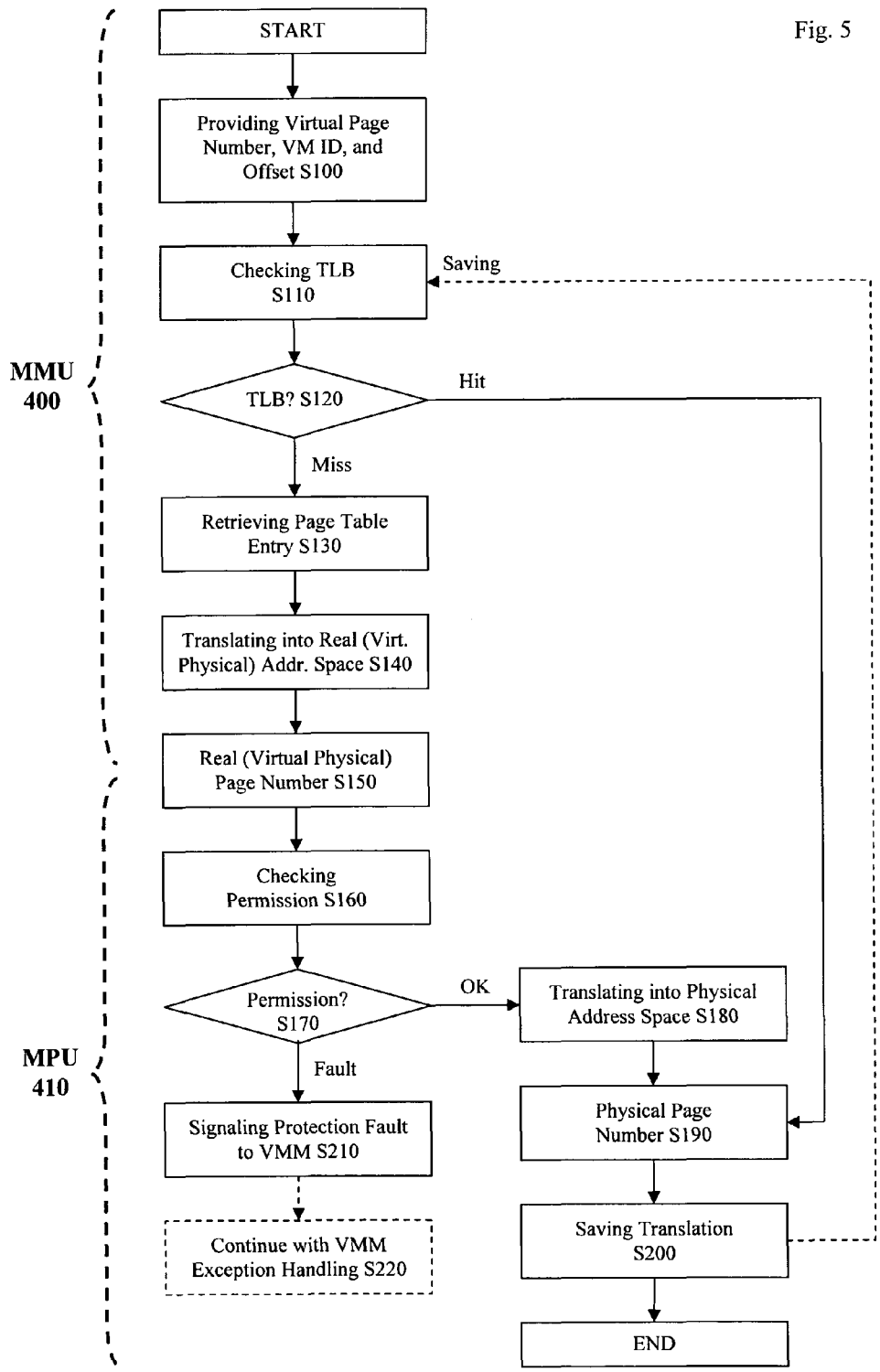
FIG. 5 depicts schematically a flow diagram of an operation sequence carried out by the memory management unit (MMU) and a memory protection unit (MPU) shown in FIG. 4 according to an exemplary embodiment of the present invention.

In the following, the operation of the memory management unit (MMU) and the memory protection unit (MPU) will be described with reference to FIG. 4, which shows a schematic block diagram of different components of both units according to an exemplary embodiment of the present invention, and FIG. 5, which shows a flow graph of the operation of the aforementioned units according to an exemplary embodiment of the present invention.

When a memory access to a virtual address is issued by guest software inside a virtual machine (VM), the address translation mapping the issued virtual address to a corresponding physical address is performed in a two-staged operation. The first operation stage is performed by the memory management unit (MMU) 350, to which the virtual machine has native access. The memory management unit (MMU) 350 converts the virtual address into a real address based on page tables maintained by the guest operating system carried out within a virtual machine (VM) or, when the translation of the virtual address has been previously performed, The memory management unit (MMU) 350 make use of the translation lookaside buffer (TLB) 300, which translates directly the virtual address into a physical address. The second operation stage is performed by the memory protection unit (MPU) 360, which is under control of the virtual machine monitor (VMM) and checks the resulting real address against the physical memory regions assigned to the virtual machine (VM before translating the real address into physical address.

In a first operation, a virtual page number 400 and an offset 410 in accordance with the virtual address is provided. Additionally, virtual machine identifier ID 115 is provided. Virtual machine identifiers IDs are assigned by the virtual machine monitor (VMM) to each virtual machine. The virtual machine identifiers IDs should be unique to each other and may be stored as part of the virtual machine (VM) context. The virtual machine identifiers IDs may be stored in a privileged CPU register, which is exclusively accessible to the virtual machine monitor (VMM).

In an operation S110 at least the virtual page number 400 is provided to the translation look-aside buffer (TLB) 300, which checks whether the corresponding physical address is already cached therein. In case of a hit, the physical address is immediately obtained from the physical page number 440 provided by the translation lookaside buffer (TLB) 300 and the offset 410. The operation ends.

In case a translation lookaside buffer (TLB) miss occurs, at least the virtual page number 400 is supplied to the page table 310. At the page table 310, the page table entry is identified in accordance with the virtual page number 400 and the corresponding real page number 420 is retrieved therefrom. The virtual page number 400 is hence translated into the real address space of the virtual machine monitor (VMM) in operations S140, S150.

In an operation S160, the translated real page number 420 retrieved form the page table 310 in accordance with the virtual page number 400 is supplied to the permission table 320. The MPU 360 maintaining the permission table 320 checks the resulting real address 420 against the physical memory regions assigned to the currently operating virtual machine (VM). In particular, it is verified whether the real address 420 is within legal memory boundaries assigned to the currently operating virtual machine (VM).

A protection fault occurs in case the mapping does not exist; i.e. the real address 420 is outside the legal memory boundaries assigned to the currently operating virtual machine (VM). In this case, a protection fault is signaled in an operation S210 to the virtual machine monitor (VMM), which may handle the protection fault in software and create the appropriate mapping. The handling of the protection fault may be also delegated to the running virtual machine (VM) or the virtual machine (VM) may be terminated upon detection of the protection fault.

In case the mapping exists, i.e. the real address 420 is within the legal memory boundaries assigned to the currently operating virtual machine (VM), the memory protection unit (MPU) 360 translates the real address to a physical page number 440 of the hardware layer of the host, in an operation S190. The physical address resulting from the physical page number 440 and the offset 410 may then used to address the physical system memory. In an operation S200, the finally obtained translation between virtual page number 400 and physical address may be reported to the translation lookaside buffer (TLB) 300, which caches the translation therebetween for later retrieval.

In order to perform the address checking against the assigned memory boundaries and real-to-physical address translation, the memory protection unit (MPU) 360 refers to a permission table. The contents of the permission table are maintained by the virtual machine monitor (VMM). In FIG. 6, an exemplary page table according to an exemplary embodiment of the present invention is schematically illustrated. It should be noted that the guest operation system of the currently operating virtual machine (VM) maintains the page table 310, which contains the translation mapping between virtual addresses (i.e. virtual page number 400 and page offset 410) and real addresses (i.e. real page number 420 and page offset 410).

The virtual machine monitor (VMM) also maintains the permission table containing the translation mappings between real addresses (i.e. real (real) page number 420 and page offset 410) and real physical addresses (i.e. physical page number 440 and page offset 410). During address translation, the permission table is indexed with the virtual machine (VM) identifier (ID) and selected bits of the virtual machine (VM) physical address. The table provides the means to map the virtual machine (VM) physical address to the corresponding physical address of the hardware layer of the host system. The address translation may be fully hardware-implemented. However, the present invention should not be understood as being limited thereto.

The permission table 320 may be implemented in different ways. One possible implementation is based on an associative array, which is indexed with the virtual machine (VM) identifier (ID) and the virtual machine (VM) physical address to be translated and contains at least one physical base address and size, which define a physical memory region of the physical system memory accessible to the virtual machine (VM). The table illustrated in FIG. 6 presents such an example 4-way associative array.

The example permission table of FIG. 6 illustratively presents memory mappings for three virtual machines VM ID 1, VM ID 2, and VM ID 3. The first virtual machines VM ID 1 maps three different physical system memory regions to its address space, which are (0x00000000 to 0x00ffffff), (0x07000000 to 0x070fffff) and (0xf0000000 to 0xf0ffffff)

Second of the memory regions (0x07000000 to 0x070fffff) is shared with virtual machine VM ID 2. The virtual machine VM ID 3 only maps one physical system memory region (0x20000000 to 0x20ffffff) and does not share any physical system memory region with one of the other virtual machines VM ID 1 and VM ID 2.

Permission checking and address translation using the illustrated permission table may be performed in accordance with following operation sequence:

```
Begin
   _Row: = Row (VM ID, Real Address)
   _Offset: = Real Address - Real Base Address (_Row)
   If (_Offset ≥ Size (_Row)) Then
      Raise Protection Fault;
   Else
      Physical Address: = Physical Base Address (_Row) + _Offset
End
```

The permission table is first indexed with the virtual machine (VM) identifier (ID), locating a set of mappings related to that identified virtual machine (VM). The real (virtual physical) base addresses stored in the set are then compared against the real (virtual physical) address that is being translated. In a specific implementation according to an exemplary embodiment of the present invention, only a predefined number of the most significant bits may be compared.

The entry with the highest real base address smaller than real address is selected. The offset within the found system memory region is then calculated by subtracting the real base address from the real address and the offset is compared against the size of the system memory region.

If the offset is out of boundaries, a protection fault is generated. If the offset is within the boundaries, the physical address is calculated by adding the corresponding physical base address to the offset. All the calculations may be done using unsigned arithmetic.

For the sake of intelligibility, full addresses have been used throughout the description referring to the exemplary permission table according to an exemplary embodiment of the present invention. It should be noted that the complexity of an implementation may be reduced when only using a predefined number of the most significant bits in each address for the calculation according to an exemplary embodiment of the present invention.

In the description above, the present invention has been illustrated with reference to a host computer 10 that runs a virtual machine monitor. It should be understood that the present invention is not limited to any particular or specific computer, or any particular or specific type thereof. Examples of computers include, but not being limited thereto, server processing devices such as mainframes, file servers, web servers, print servers etc; network appliances; desktop processing devices such as workstation computers, personal computers etc.; and portable processing device such as notebooks, personal digital assistants (PDA), smart phones etc. The latter portable processing device may be capable for wireless communication.

Figure 7:
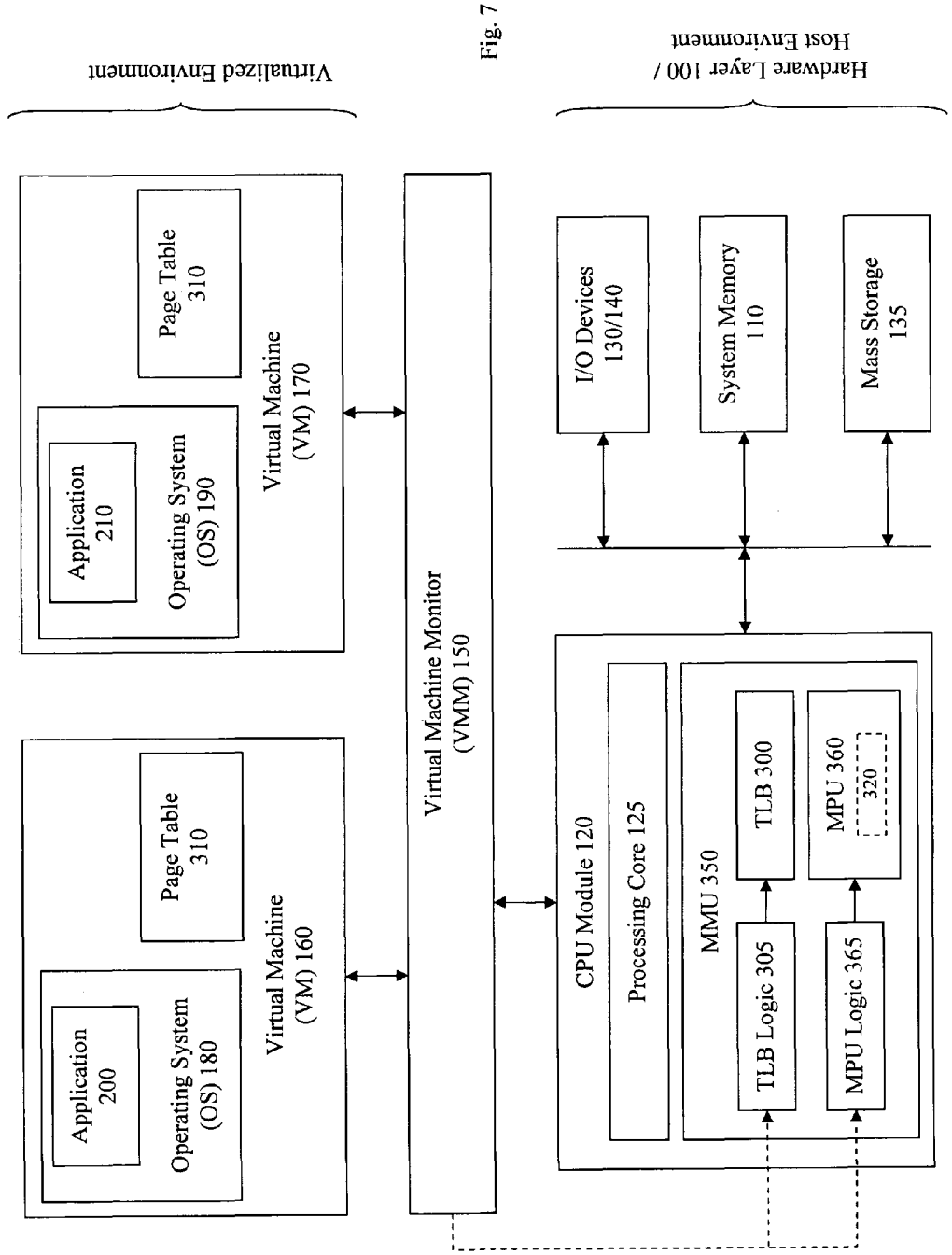
FIG. 7 depicts schematically block diagram showing functional components of a virtualized processing environment according to an exemplary embodiment of the present invention.

FIG. 7 schematically illustrates a block diagram of functional components of a virtualized computer system according to an exemplary embodiment of the present invention. The system comprises a CPU module 120, a memory management unit 350, a system memory 110 such as a random access memory (RAM), and a mass storage 135 implemented for instance on magnetic storage technology, optical storage technology, non-volatile memory technology several I/O devices 130/140. The CPU module 120, which may be called processor, includes a processing core 125 and the memory management unit 350, which comprises a translation lookaside buffer (TLB) 300 and a memory protection unit (MPU) 360.

According to the exemplary embodiment of the present invention, the system further comprises a virtual machine (VM) 160 and a virtual machine (VM) 170. Each virtual machine (VM) 160, 170 is exposed by the virtual machine monitor (VMM) 150. A guest operating system 180 with a guest application 200 is carried out within the respective virtual machine (VM) 160 and a guest operating system 190 with a guest application 210 is carried out within the respective virtual machine (VM) 170. The applications 200 and 210 represent one or more guest applications carried out on the top of the respective operating system 180 and 190, respectively. Further, each virtual machine maintains its own page table 310.

The CPU 120 and the memory management unit 350 may be combined within a single integrated circuit (IC) component, they may be implemented in a same component module, or they may be separate components. Also, the translation lookaside buffer (TLB) 300 may be combined within the same IC component as the memory management unit (MMU) 350, or the translation lookaside buffer (TLB) 300 may be a separate component. Further, the memory protection unit (MPU) 360 may be combined within the same IC component as the memory management unit (MMU) 350, or memory protection unit (MPU) 360 may be a separate component.

The CPU 120 illustrated in the exemplary embodiment of FIG. 7 is implemented on the basis of a CPU module 120 comprising a processing core 125 configured for executing instructions of any computer programs and the memory management unit 350 including in turn the translation lookaside buffer 300 with logic 305 and the memory protection unit 360 with logic 365. The components of the CPU module 120 may be combined in a same integrated circuit, may be combined in a same component module housing, or may be designed as one or more separate components.

The memory management unit 350 is designed such that the access to the translation lookaside buffer (TLB) 300 is much quicker than an access to the page tables 310. The translation lookaside buffer (TLB) 300 can typically hold a relative small number of translations or mappings, such as for example 8 to 64 entries, in comparison to the page tables. As a result, the entries may be evicted form the translation lookaside buffer (TLB) from time to time. Typically, when the memory management unit (MMU) 350 walks the page tables to determine a new mapping, the memory management unit (MMU) 350 may evict an existing entry in the translation lookaside buffer (TLB) 300 to allow for entering the new mapping/translation.

As aforementioned, the translation lookaside buffer (TLB) 300 according to an exemplary embodiment of the present invention is implemented on the basis of a hardware circuitry comprising a buffer (storage) 300 and logic 305. The buffer storage may be an associative buffer configured for accelerated access to the mappings/translations stored in the buffer. In particular, the buffer storage may be implemented on the basis of static random access memory (SRAM), dynamic random access memory (DRAM), or may be any storage means implemented on any other memory storage technology allowing for accelerated access thereto. The logic 305 implements the aforementioned functionality of the translation lookaside buffer (TLB) 300. In particular, the logic 305 is configured to check whether the buffer storage 300 caches a physical base address corresponding to a supplied virtual page number and in case of a hit, the logic 305 is adapted to translate supplied virtual page number according to the stored translations/mappings.

As aforementioned, the memory protection unit (MPU) 360 according to an exemplary embodiment of the present invention is a hardware implemented circuit comprising a buffer (storage) 360 and a logic 365. The buffer storage may be an associative buffer configured for accelerated access to the mappings/translations stored in the buffer. In particular, the buffer storage may be implemented on the basis of static random access memory (SRAM), dynamic random access memory (DRAM), or may be any storage means implemented on any other memory storage technology allowing for accelerated access thereto. The permission table 320 is buffered in the buffer storage of the memory protection unit (MPU) 320. The logic 365 implements the aforementioned functionality of the memory protection unit (MPU) 360. In particular, the logic 365 is configured to handle memory protection and memory sharing between different virtual machines (VMs). More particularly, the logic 365 is configured to translates between the real address space (in other words, virtual (machine) physical addresses of the virtual (machine) physical address space) set up by the virtual machine monitor (VMM) (also designated "pseudo physical addresses") and the physical address space of the hardware layer of the host.

During execution of a computer program, the CPU 120 generates addresses within the virtual address space of the computer program, for reading data from and writing data to the system memory 110. The addresses generated by the CPU 120 are called virtual addresses; however, the virtual addresses cannot be directly applied to the system memory 110 in a virtual memory system to access the desired (physical system) memory locations. Instead, the virtual addresses must first be translated into corresponding physical addresses within a physical address space. The physical address space comprises the addresses that are used to access specific memory locations within the system memory 110.

The memory management unit (MMU) 350 uses the page tables 310 to perform a mapping/translation from virtual page numbers to real page numbers. When the memory management unit (MMU) 350 receives a virtual address from the CPU 120, the memory management unit (MMU) 350 reads the virtual page number from the upper address bits of the address, The memory management unit (MMU) 350 may then read information from the page table 310 relating to the desired virtual page number.

The memory management unit (MMU) 350 then supplies the retrieved real page number along with the offset from the virtual address to the memory protection unit (MPU) 360. The memory protection unit (MPU) 360 maintaining the permission table 320 checks the real address resulting from the page table retrieval against physical memory regions assigned to the currently operating virtual machine (VM). In particular, it is verified whether the real address is within legal memory boundaries assigned to the currently operating virtual machine (VM). The memory protection unit (MPU) 360 may detect a protection fault in case the mapping does not exist; i.e. the real address is outside the legal memory boundaries assigned to the currently operating virtual machine (VM). For instance, the protection fault may be signaled to the virtual machine monitor (VMM), which may handle the protection fault in software and create the appropriate mapping.

In case the mapping exists, i.e. the real address is within the legal memory boundaries assigned to the currently operating virtual machine (VM), the memory protection unit (MPU) 360 translates the supplied real address into physical page number of the system memory 110. The physical address resulting from the physical page number and the offset may then used to address the desired location of the physical system memory 110. In addition, the memory management unit (MMU) 350 writes the virtual page number and the physical page number into an entry in the translation lookaside buffer (TLB) 300, indicating the direct virtual-to-physical address mapping between respective pages.

Accessing the page tables 310 in the aforementioned manner to determine a mapping from a virtual page number to a real page number may be called walking the page tables. Now, the mapping from the virtual page number to the physical page number has been written into the translation lookaside buffer (TLB) 300, if a subsequent memory access is to the same virtual page number, the memory management unit (MMU) 350 can find the appropriate mapping/translation in the translation lookaside buffer (TLB) 300 within the memory management unit (MMU) 350, without having to access the page table 310 hold by the respective virtual machine (VM) 160, 170 in the system memory 110. The memory management unit (MMU) 350 is designed such that the access to the translation lookaside buffer (TLB) 300 is much quicker than an access to the page tables 310. As aforementioned, the translation lookaside buffer (TLB) 300 may typically hold a relatively small number of page mappings in comparison to the size of the page tables 310. Thus, when the memory management unit (MMU) 350 receives a virtual address from the CPU 120, the memory management unit (MMU) 350 may first access the translation lookaside buffer (TLB) 300 to determine of the desired mapping/translation is buffered therein. If the translation is not in the translation lookaside buffer (TLB) 300, then the memory management unit (MMU) 350 should perform the page table walk as described above.

From the forgoing description, it will be apparent that modifications can be made to the system without departing from the teaching of the present invention. Accordingly, the scope of the invention is only to be limited as necessarily by the accompanying claims. In particular, alternative, different implementations of the permission table are also possible. The present invention should be understood as not being limited thereto.

The invention claimed is:

1. A method, comprising:
   defining a virtual address;
   defining a virtual machine to access virtual memory using the virtual address;
   assigning a virtual machine identifier to the virtual machine;
   determining whether a first buffer store includes a physical address corresponding to the virtual address;
   in response to determining that the first buffer store excludes the physical address corresponding to the virtual address, verifying at a protection unit whether the physical address referenced by the virtual address is within boundaries of one or more physical system memory regions assigned to the virtual machine;
   in response to determining that the first buffer store is inconsistent with guest software executing in the virtual machine due to a page-fault in the virtual machine, examining a guest page-table associated with the guest software; and
   in response to determining that the guest page-table does not include a valid entry based on the examining, determining that the page fault is a true page-fault and injecting the page fault into the virtual machine.

2. The method according to claim 1, comprising:
translating the virtual address into a real address at a second buffer comprising the guest page table; and
translating the real address into the physical address at the protection unit.

3. The method according to claim 2, comprising:
maintaining said protection unit by said virtual machine monitor; and
storing said second buffer in a physical host system memory assigned to said virtual machine.

4. The method according to claim 2, comprising:
maintaining said translations of said second buffer by said virtual machine.

5. The method according to claim 1, comprising:
storing one or more physical host memory regions assigned to one or more virtual machines in a permission table that is implemented using an associative array, the protection unit including the permission table.

6. The method according to claim 1, wherein the virtual machine identifier further comprises the physical address.

7. The method according to claim 1, comprising:
assigning said virtual machine identifiers to each virtual machine by a virtual machine monitor.

8. A method comprising:
under control of one or more processors configured with instructions that are executable by the one or more processors to perform acts comprising:
defining a virtual machine;
defining a virtual address for use by the virtual machine;
designating a first buffer to store virtual address to physical address translations;
determining a physical address corresponding to the virtual address;
assigning a virtual machine identifier to the virtual machine;
determining whether the physical address is included in one or more physical system memory regions assigned to the virtual machine;
in response to determining that the first buffer is inconsistent with guest software executing in the virtual machine due to a page-fault in the virtual machine, examining a guest page-table associated with the guest software; and
in response to determining that the guest page-table does not include a valid entry based on the examining, determining that the page fault is a true page-fault and injecting the page fault into the virtual machine.

9. The method according to claim 8, further comprising:
storing virtual address to real address translations in a second buffer, the second buffer including the guest page table, the first buffer and the second buffer stored in a management unit; and
translating a real address into the physical address.

10. The method according to claim 9, wherein:
the first buffer is included in a processor; and
the second buffer is stored in a physical host system memory assigned to the virtual machine.

11. The method according to claim 9, wherein the virtual machine maintains the virtual address to physical address translations of the second buffer.

12. The method according to claim 8, wherein:
a permission table adapted for storing one or more physical host memory regions assigned to one or more virtual machines, the permission table implemented using an associative array, the protection unit including the permission table.

13. One or more non-transitory computer readable media storing instructions that are executable by one or more processors to perform acts comprising:
defining a virtual address;
defining a virtual machine;
assigning the virtual address to the virtual machine;
determining whether a first buffer store is capable of translating the virtual address to a physical address;
assigning a virtual machine identifier to the virtual machine;
in response to determining that the first buffer store is incapable of translating the virtual address to the physical address, verifying at a protection unit whether a physical address obtained from the virtual address is within boundaries of one or more physical system memory regions assigned to the virtual machine;
in response to determining that the first buffer store is inconsistent with guest software executing in the virtual machine due to a page-fault in the virtual machine, examining a guest page-table associated with the guest software; and
in response to determining that the guest page-table does not include a valid entry based on the examining, determining that the page fault is a true page-fault and injecting the page fault into the virtual machine.

14. The one or more non-transitory computer readable media according to claim 13, further comprising:
storing virtual address to real address translations in a second buffer, the second buffer including the guest page table, the first buffer and the second buffer stored in a management unit; and
translating a real address into the physical address.

15. The one or more non-transitory computer readable media according to claim 14, wherein:
the first buffer is included in a processor; and
the second buffer is stored in a physical host system memory assigned to the virtual machine.

16. The one or more non-transitory computer readable media according to 14, wherein the virtual machine maintains the virtual address to physical address translations of the second buffer.

17. The one or more non-transitory computer readable media according to claim 13, wherein:
a permission table adapted for storing one or more physical host memory regions assigned to one or more virtual machines, the permission table implemented using an associative array, the protection unit including the permission table.

18. A computing device, comprising:
one or more processors;
one or more computer readable media storing instructions that are executable by the one or more processors to perform acts comprising:
defining a virtual address;
defining a virtual machine to access virtual memory using the virtual address;
assigning a virtual machine identifier to the virtual machine, the virtual machine identifier comprising the virtual address;
determining whether a first buffer store includes a physical address corresponding to the virtual address;
in response to determining that the first buffer store excludes the physical address corresponding to the virtual address, verifying at a protection unit whether the physical address referenced by the virtual address is within boundaries of one or more physical system memory regions assigned to the virtual machine;

in response to determining that the first buffer store is inconsistent with guest software executing in the virtual machine due to a page-fault in the virtual machine, examining a guest page-table associated with the guest software; and in response to determining that the guest page-table does not include a valid entry based on the examining, determining that the page fault is a true page-fault and injecting the page fault into the virtual machine.

19. The computing device according to claim 18, comprising:

translating the virtual address into a real address at a second buffer comprising the guest page table; and translating the real address into the physical address at the protection unit.

20. The computing device according to claim 19, comprising:

maintaining the protection unit by the virtual machine monitor; and storing the second buffer in a physical host system memory assigned to the virtual machine.

21. The computing device according to claim 19, comprising:

maintaining the translations of the second buffer by the virtual machine.

22. The computing device according to claim 18, comprising:

storing one or more physical host memory regions assigned to one or more virtual machines in a permission table.

* * * * *